(12) United States Patent
Hayashi et al.

(10) Patent No.: US 8,705,106 B2
(45) Date of Patent: Apr. 22, 2014

(54) PRINTING APPARATUS, INFORMATION PROCESSING APPARATUS, PRINTING SYSTEM, AND COMPUTER READABLE MEDIUM

(75) Inventors: Hiroshi Hayashi, Kanagawa (JP); Takayuki Yoshida, Kanagawa (JP); Shigeaki Saito, Kanagawa (JP); Kanou Saitou, Kanagawa (JP); Kyoichi Kawakita, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 113 days.

(21) Appl. No.: 13/405,004

(22) Filed: Feb. 24, 2012

(65) Prior Publication Data

US 2013/0070290 A1 Mar. 21, 2013

(30) Foreign Application Priority Data

Sep. 20, 2011 (JP) ................................. 2011-205386

(51) Int. Cl.
*G06F 15/00* (2006.01)

(52) U.S. Cl.
USPC .......................................................... 358/1.15

(58) Field of Classification Search
USPC .......................................................... 358/1.15
See application file for complete search history.

(56) References Cited

U.S. PATENT DOCUMENTS

2004/0021891 A1* 2/2004 Higuchi et al. ............... 358/1.14
2008/0316520 A1* 12/2008 Suzuki et al. ................ 358/1.13

FOREIGN PATENT DOCUMENTS

JP  2005-182477 A  7/2005

* cited by examiner

*Primary Examiner* — Saeid Ebrahimi Dehkordy
(74) *Attorney, Agent, or Firm* — Sughrue Mion, PLLC (57) ABSTRACT

A printing apparatus includes a print section that performs printing according to print data, a registering section that registers in advance an information processing apparatus creating and transmitting print data in response to a print instruction from a user, and storing print data that has not been received by a transmission destination in a memory, a determination section that determines whether the print data that has not been received by the printing apparatus is stored in the registered information processing apparatus, when the printing apparatus changes from a data-reception state to a non-data-reception state, a request section that requests the information processing apparatus, in which the print data is determined to be stored, to transmit the stored print data, and a controller that controls the print section to perform printing according to the print data transmitted in response to the request, when the print data is received.

12 Claims, 7 Drawing Sheets

```
USER ID      : 001
USER NAME    : Taro Yamada
HOST IP      : 192.272.214.xxx
```

```
USER ID      : 001
USER NAME    : Taro Yamada
PRINT DATA
    1. memo.xls
    2. calendar.pdf Select print data
```

PRINTING APPARATUS, INFORMATION PROCESSING APPARATUS, PRINTING SYSTEM, AND COMPUTER READABLE MEDIUM

CROSS-REFERENCE TO RELATED APPLICATIONS

This application is based on and claims priority under 35 USC 119 from Japanese Patent Application No. 2011-205386 filed Sep. 20, 2011.

BACKGROUND

(i) Technical Field

The present invention relates to a printing apparatus, an information processing apparatus, a printing system, and a computer readable medium.

SUMMARY

According to an aspect of the invention, there is provided a printing apparatus including a print section, a registering section, a determination section, a request section, and a controller. The print section performs printing on the basis of print data. The registering section registers in advance an information processing apparatus. The information processing apparatus creates and transmits print data in response to a print instruction from a user, and stores print data that has not been received by a transmission destination in a memory. The determination section determines whether or not the print data that has not been received by the printing apparatus is stored in the registered information processing apparatus, when the printing apparatus returns back to a state of being capable of receiving print data from a state of being not capable of receiving print data. The request section requests the information processing apparatus, in which the print data is determined to be stored, to transmit the stored print data. The controller controls the print section to perform printing on the basis of the print data transmitted in response to the request from the request section, when the print data is received.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments will be described in detail with reference to the drawings.

First Exemplary Embodiment

Figure 1:
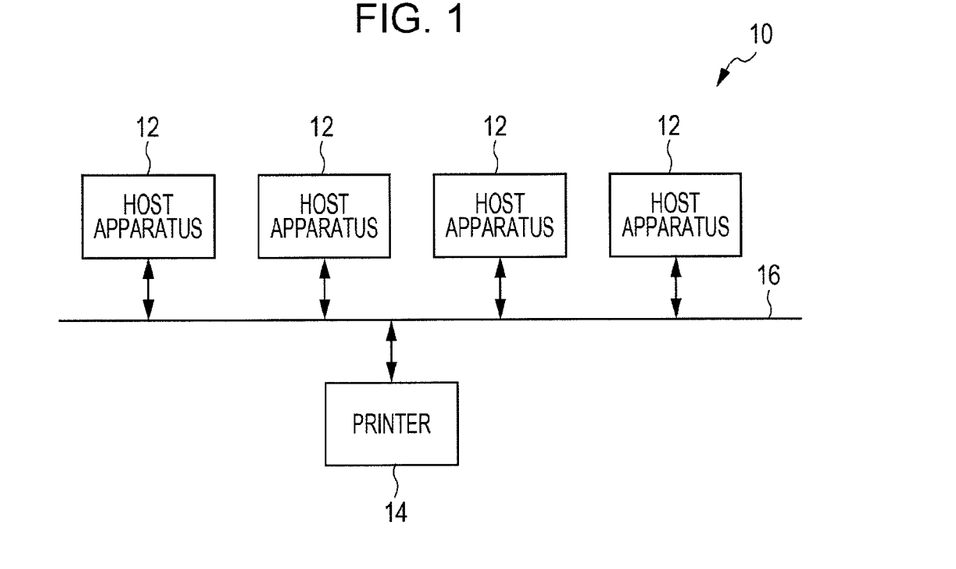
FIG. 1 is a diagram illustrating a configuration of a printing system according to first and second exemplary embodiments of the invention.

As illustrated in FIG. 1, a printing system 10 according to a first exemplary embodiment includes host apparatuses 12 that serve as information processing apparatuses, and a printing apparatus (hereinafter, referred to as a printer) 14, which are connected to each other via a communication component 16. Four host apparatuses 12 are illustrated in FIG. 1. However, the number of host apparatuses 12 is not limited to four, and may be less than or more than four.

The communication component 16 may be a public circuit, or may be a network, such as the Internet, a local area network (LAN), or a wide area network (WAN). The communication component 16 may be a wireless communication component or a wired communication component.

Upon receiving a print instruction from a user, each of the host apparatuses 12 creates print data in accordance with the print instruction and transmits the created print data to the printer 14. The print data includes data representing an image to be printed. The print data may also include print setting information used when the print data is printed, such as a specification of a print range, a specification of whether or not scaling is to be performed, a specification of color or black-and-white printing, and a paper size.

The printer 14 performs printing in accordance with the print data transmitted from the host apparatus 12. The printer 14 according to the exemplary embodiment is configured to be switched to a power-saving state for reducing power consumption by stopping supply of power for various components that are included in the printer 14, and is configured to return back from the power-saving state by releasing the power-saving state and starting the stopped supply of power. The printer 14 is configured to be switched to the power-saving state when a predetermined condition is satisfied, for example, when a power-saving button is pressed or when a state in which a user does not operate the printer 14 has continued for at least a predetermined time period.

The printer 14 according to the exemplary embodiment is not capable of receiving print data when the printer 14 is not only in the power-off state but also in the power-saving state, because supply of power for components that are related to communication operations is stopped. When a user presses a power-saving release button provided on an operation panel 34 described below, the power-saving state is released, and the printer 14 is switched to a non-power-saving state so as to be in a state of being capable of receiving print data.

In the printing system 10 according to the exemplary embodiment, a management apparatus such as a print server which temporarily stores print data transmitted from the host apparatus 12 and which transfers the print data to the printer 14 is not provided between the host apparatus 12 and the printer 14. Accordingly, print data is directly transmitted/ received between the host apparatus 12 and the printer 14.

Figure 2:
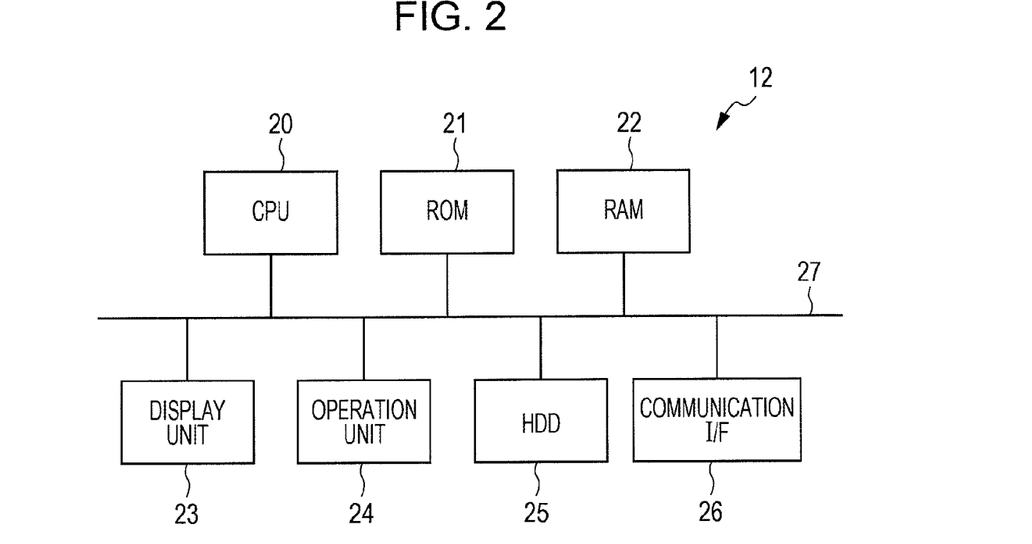
FIG. 2 is a diagram illustrating a configuration of an information processing apparatus (host apparatus) according to the first and second exemplary embodiments.

FIG. 2 is a diagram illustrating an exemplary configuration of the host apparatus 12.

The host apparatus 12 according to the exemplary embodiment includes a central processing unit (CPU) 20, a read only memory (ROM) 21, a random access memory (RAM) 22, a display unit 23, an operation unit 24, a hard disk drive (HDD) 25, and a communication interface (I/F) 26, which are connected to each other via a bus 27.

The CPU 20 executes programs stored in the ROM 21 or the HDD 25 to control operations of the entire host apparatus 12. The ROM 21 stores programs executed by the CPU 20, and data which is necessary for the processes performed by the CPU 20, for example. The RAM 22 is used as a work memory.

The HDD 25 stores programs executed by the CPU 20, and various data. The HDD 25 also includes a storage area (hereinafter, referred to as a print queue) for storing print data when the printer 14 fails to receive the print data transmitted from the host apparatus 12.

Programs stored in the HDD 25 or the ROM 21 include programs for a printer driver. Upon receiving a print instruction from a user, the printer driver creates print data in accordance with the print instruction and transmits the created print data to the printer 14 via the communication I/F 26. Additionally, upon receiving an inquiry about a state of the print queue from the printer 14 via the communication I/F 26, the printer driver checks the storage state of the print queue in accordance with the inquiry and notifies the printer 14 of the storage state via the communication I/F 26. Furthermore, upon receiving a request for transmission of print data from the printer 14 via the communication I/F 26, the printer driver reads out the print data from the print queue and transmits the print data to the printer 14 via the communication I/F 26.

The storage medium for storing programs executed by the CPU 20 is not limited to the HDD 25 or the ROM 21. The storage medium may be, for example, a flexible disk, a digital versatile disk (DVD), or a universal serial bus (USB) memory (not illustrated), or may be a storage device in another apparatus (not illustrated) which is connected to the communication component 16.

The display unit 23 is constituted by, for example, a liquid crystal display (LCD), and displays various images, messages, and the like under the control of the CPU 20. The operation unit 24 is constituted by, for example, a keyboard and a mouse. A user operates the operation unit 24 so as to input or specify various types of information.

The communication I/F 26 is an interface for receiving/transmitting data from/to other apparatuses via the communication component 16.

Figure 3:
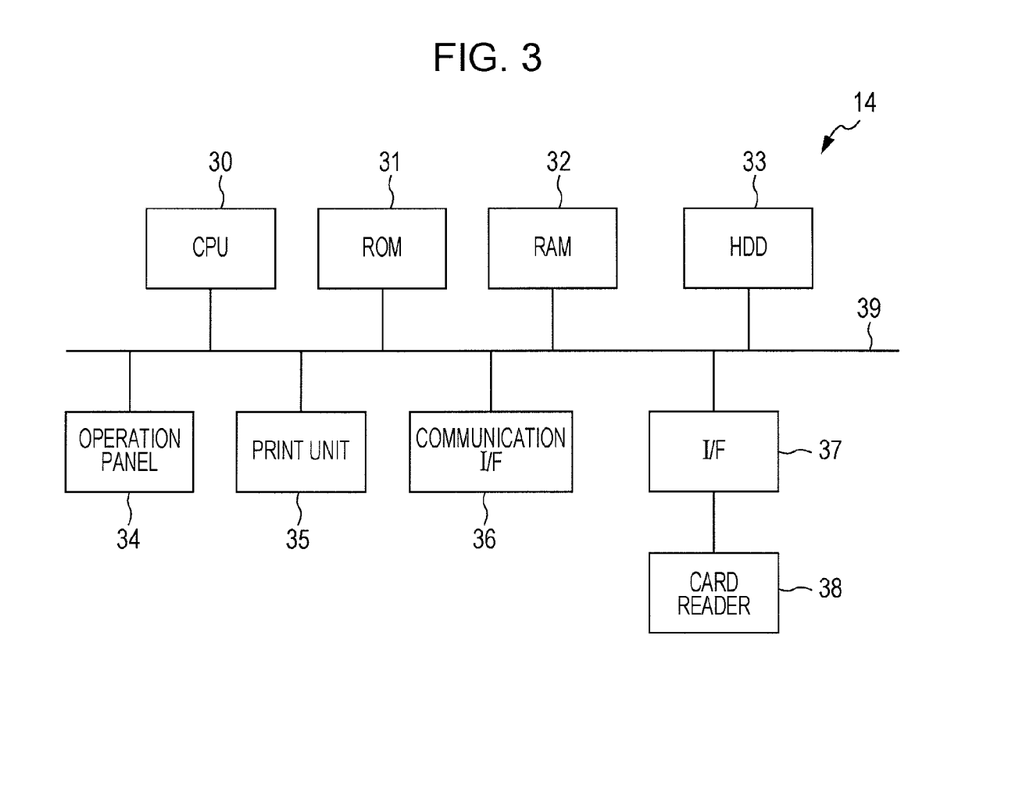
FIG. 3 is a diagram illustrating a configuration of a printing apparatus (printer) according to the first and second exemplary embodiments.

FIG. 3 is a diagram illustrating an exemplary configuration of the printer 14.

The printer 14 includes a CPU 30, a ROM 31, a RAM 32, an HDD 33, the operation panel 34, a print unit 35, and a communication I/F 36, and an I/F 37, which are connected to each other via a bus 39.

The CPU 30 executes programs stored in the ROM 31 or the HDD 33 to control operations of the entire printer 14. The ROM 31 stores programs executed by the CPU 30, and data which is necessary for the processes performed by, for example, the CPU 30. The RAM 32 is used as a work memory.

The operation panel 34 is constituted by a display unit including an LCD, and ten keys, a touch panel, and the like, and is provided with an operation acceptance unit for accepting operations performed by a user. The operation panel 34 is also provided with a power button for turning the printer 14 on/off, and a power-saving release button for releasing the power-saving state of the printer 14 and switching the printer 14 to the non-power-saving state.

The HDD 33 stores programs executed by the CPU 30. Programs stored in the HDD 33 or the ROM 31 include a program for a process performed when the printer 14 enters the power-on state from the power-off state or when the power-saving state is released, and a program for user authentication. These programs will be described in detail below.

Figure 4:
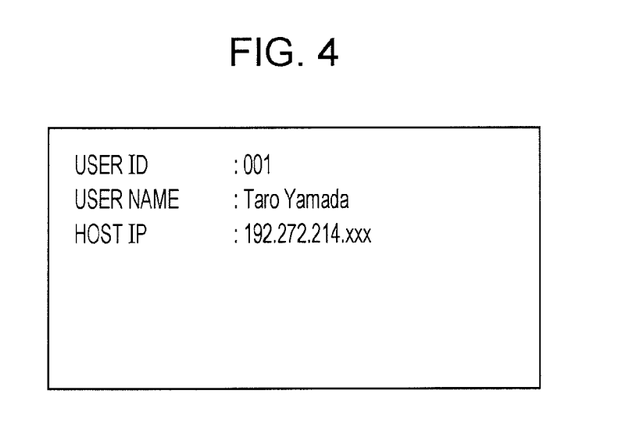
FIG. 4 is a diagram illustrating a registration state for a host apparatus.

A predetermined storage area in the HDD 33 stores the IP address of a host apparatus 12 (hereinafter, referred to as a host IP) in advance as identification information for identifying the host apparatus 12. Storing of a host IP into the storage area in the HDD 33 is herein expressed as "registering a host apparatus". According to the exemplary embodiment, a user or an administrator, for example, operates the operation panel 34 in advance so as to input a host IP, a user ID, and a user name to the printer 14, as illustrated in FIG. 4. The host IP, the user ID, and the user name are stored in the HDD 33 of the printer 14 in such a manner that the host IP, the user ID, and the user name are associated with each other, whereby a host apparatus is registered. The user ID is identification information for identifying a user who operates the host apparatus 12 that is given the host IP associated with the user ID. The user name is a name used by the user.

The print unit 35 forms an image on a recording medium, i.e., performs printing, in accordance with print data.

The communication I/F 36 is an interface for receiving/transmitting data from/to other apparatuses via the communication component 16.

A card reader 38 is connected to the I/F 37. The card reader 38 reads out information (a user ID in the case of the printing system 10) that is recorded in the memory of an integrated circuit (IC) card. The printer 14 is provided with a user authentication function. When the user authentication function of the printer 14 is enabled, the CPU 30 executes a program for user authentication and uses the user ID, which has been read using the card reader 38, to authenticate the user.

Now, operations of the printing system 10 according to the exemplary embodiment will be described. In this exemplary embodiment, operations in the case of not using the user authentication function will be described.

Figure 5:
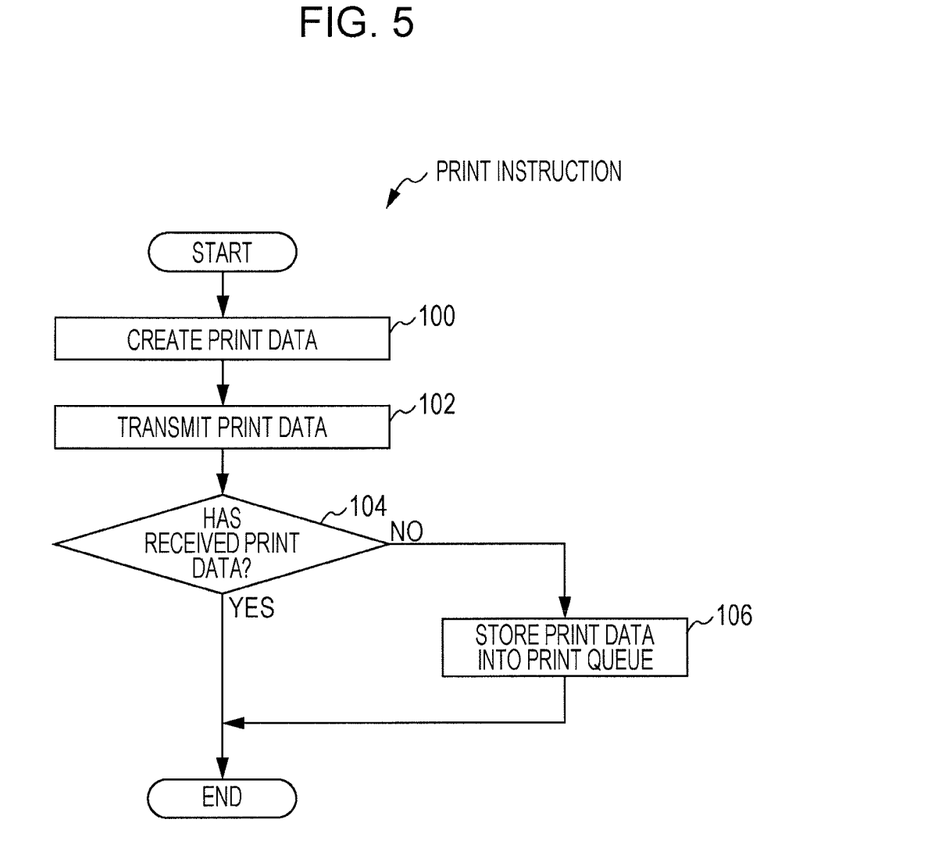
FIG. 5 is a flowchart of a process that is performed by the host apparatus according to the first and second exemplary embodiments.

In the host apparatus 12, when a user operates the operation unit 24 so as to specify data which the user wants to print, and specifies printing settings for execution of printing by inputting setting information from a setting screen provided by software such as the printer driver, the process illustrated in FIG. 5 is started.

In step 100, the host apparatus 12 creates print data in accordance with the printing settings given by the user.

In step 102, the host apparatus 12 transmits the created print data to the printer 14.

In step 104, the host apparatus 12 determines whether or not the printer 14 has received the transmitted print data. According to this exemplary embodiment, if the host apparatus 12 receives a receipt notification from the printer 14 in a time period until a predetermined time period has elapsed after the transmission of the print data, the result of the determination is YES. If the host apparatus 12 receives no receipt notifications in the time period from the printer 14, the result of the determination is NO.

Alternatively, the maximum number of retransmissions may be predetermined. When the host apparatus 12 receives no receipt notifications in the time period, the host apparatus 12 may repeatedly retransmit the print data until the number of retransmissions reaches the maximum number. If the host apparatus 12 receives no receipt notifications from the printer 14 even when the number of retransmissions reaches the maximum number, the result of the determination is NO in step 104.

If the result of the determination is YES in step 104, the process ends because the printer 14 has successfully received the print data. If the result of the determination is NO in step 104, the process proceeds to step 106, and the host apparatus 12 stores the print data which has not been received by the printer 14 into the print queue.

Figure 6:
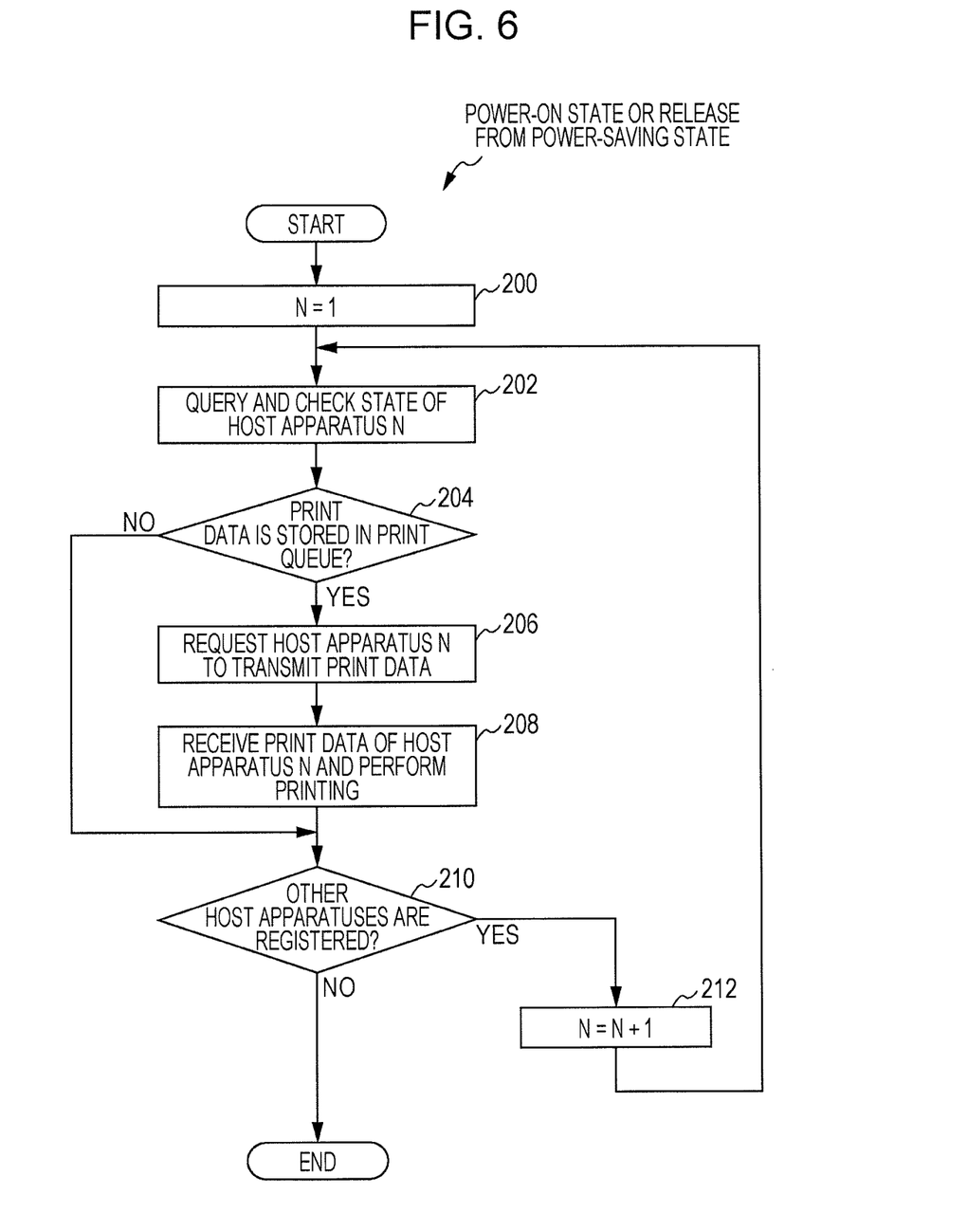
FIG. 6 is a flowchart of a process that is performed by the printer according to the first exemplary embodiment.

The printer 14 is not capable of receiving the print data when the printer 14 is in the power-off state or in the power-saving state. However, when the power is turned on from the power-off state or when the printer 14 returns back to the non-power-saving state from the power-saving state, the printer 14 is capable of receiving the print data. Accordingly, when a user operates the power button of the printer 14 so as to cause the printer 14 to enter the power-on state from the power-off state or when a user presses the power-saving release button of the printer 14 so as to release the power-saving state, the process illustrated in FIG. 6 is performed by the printer 14.

In step 200, the printer 14 sets N to 1.

In step 202, the printer 14 queries, i.e., transmits an inquiry to, a host apparatus 12 that is registered as the Nth apparatus (hereinafter, referred to as a host apparatus N) among the host apparatuses 12 registered in advance about the storage state of the print queue, and checks the storage state.

Figure 7:
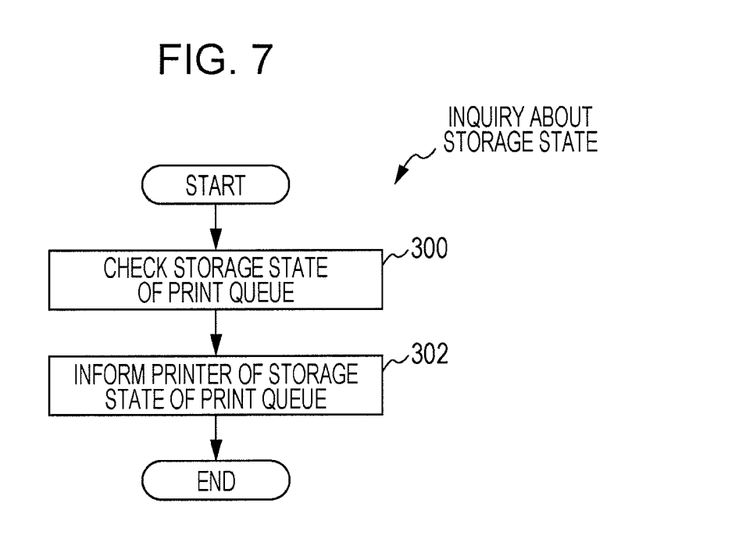
FIG. 7 is a flowchart of a process that is performed by the host apparatus according to the first and second exemplary embodiments.

FIG. 7 is a flowchart of a process performed by a host apparatus 12 when the host apparatus 12 receives an inquiry about the storage state of the print queue.

In step 300, the host apparatus 12 checks the storage state of the print queue of the host apparatus 12, and determines whether or not print data is stored in the print queue.

In step 302, the host apparatus 12 notifies the printer 14 of the storage state of the print queue thereof. In other words, the host apparatus 12 transmits information indicating whether or not print data is stored in the print queue to the printer 14.

Upon receiving the information, in step 204 illustrated in FIG. 6, the printer 14 refers to the received information and determines whether or not print data is stored in the print queue of the host apparatus N.

If the result of the determination is YES in step 204, the process proceeds to step 206, and a request for transmission of the print data stored in the print queue of the host apparatus N is transmitted to the host apparatus N.

Figure 8:
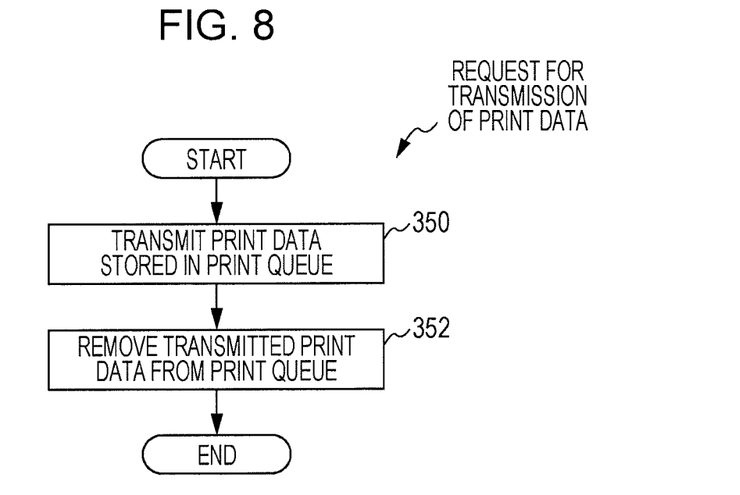
FIG. 8 is a flowchart of a process that is performed by the host apparatus according to the first and second exemplary embodiments.

FIG. 8 is a flowchart of a process performed by a host apparatus 12 when the host apparatus 12 receives a request for transmission of print data, from the printer 14.

In step 350, the host apparatus 12 reads out print data stored in the print queue thereof and transmits the print data to the printer 14.

In step 352, the host apparatus 12 removes the transmitted print data from the print queue. The print data may be removed when the host apparatus 12 receives, from the printer 14, a notification which indicates that the printer 14 has received the transmitted print data.

In step 208 in FIG. 6, the printer 14 receives the print data transmitted from the host apparatus N in response to the request for transmission of the print data, and transmits a receipt notification to the host apparatus N. The printer 14 also controls the print unit 35 to perform printing in accordance with the received print data. After the printing is finished, the process proceeds to step 210.

If the result of the determination is NO in step 204, the process skips steps 206 and 208, and proceeds to step 210.

In step 210, the printer 14 determines whether or not other host apparatuses 12 are registered. If the result of the determination is YES in step 210, the process proceeds to step 212, the printer 14 adds 1 to N, and the process returns back to step 202.

If the result of the determination is NO in step 210, the process ends because the printer 14 has checked the presence/absence of print data for all of the registered host apparatuses 12 and has finished necessary printing.

Now, as a comparison example for comparison with the exemplary embodiment, a process performed by a printing system of the related art when a printer 14 fails to receive print data transmitted from a host apparatus 12 because the printer 14 is in the power-off state or in the power-saving state will be described.

When the printer 14 fails to receive print data because the printer 14 is in the power-off state or in the power-saving state, in the related art, the host apparatus 12 cancels the transmission of the print data and removes the print data. A user moves to the location of the printer 14, and presses the power button or the power-saving button of the printer 14 so as to cause the printer 14 to return back to the power-on state or the non-power-saving state, so that the printer 14 is capable of receiving print data. After that, the user returns back to the location of the host apparatus 12, and operates the host apparatus 12 again so as to input a print instruction. The user then needs to move to the printer 14 again to pick up the printed material.

In contrast, according to the exemplary embodiment, when the printer 14 fails to receive print data transmitted from the host apparatus 12, the host apparatus 12 stores the print data. Then, when the printer 14 enters a state of being capable of receiving print data due to the operation performed by the user, the printer 14 requests the host apparatus 12, which is registered, to transmit the print data stored in the host apparatus 12, and obtains and prints the print data. Accordingly, the user simply waits at the location of the printer 14 to obtain the printed material. Thus, the user does not need to operate the host apparatus 12 again to retransmit the print data. In addition, no management apparatuses are necessary which receive print data from the host apparatus 12, which manage the received print data, and which transfer the print data to the printer 14.

According to the exemplary embodiment, an example has been described in which the processes illustrated in FIGS. 5, 7, and 8 are performed as a function of the printer driver. However, the programs are not limited to a printer driver as long as the programs execute these processes.

Second Exemplary Embodiment

In a second exemplary embodiment, operations of the printing system 10 in the case of using a user authentication function will be described. The configurations of the printing system 10, the host apparatus 12, and the printer 14 according to the second exemplary embodiment are similar to those of the first exemplary embodiment and will not be described.

Processes performed by the host apparatus 12 (FIGS. 5, 7, and 8) are similar to those of the first exemplary embodiment and will not be described.

Figure 9:
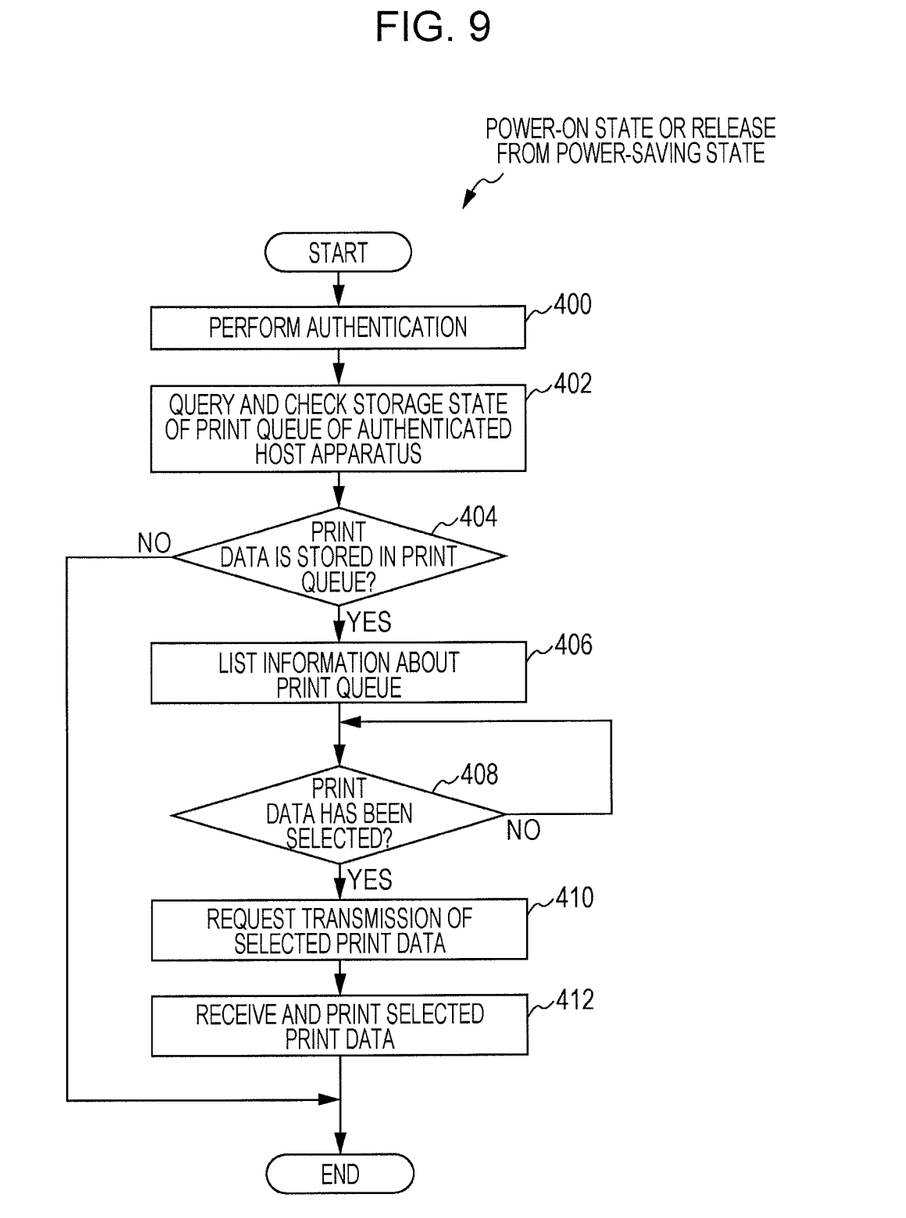
FIG. 9 is a flowchart of a process that is performed by the printer according to the second exemplary embodiment.

FIG. 9 is a flowchart of a process performed by the printer 14 when a user operates the power button of the printer 14 so as to cause the printer 14 to enter the power-on state from the power-off state, or when a user presses the power-saving release button of the printer 14 so as to release the power-saving state, according to the second exemplary embodiment.

In step 400, when a user holds an IC card close to the card reader 38 provided for the printer 14, the card reader 38 reads out the user ID stored in the memory of the IC card. The printer 14 uses the user ID that has been read to perform an authentication process. For example, if the user ID that has been read is a registered user ID, the result of the authentication is success. If the user ID is not a registered user ID, the result of the authentication is failure. When the result of the authentication is failure, printing in the printer 14 may not be allowed. A process performed when the result of the authentication is failure will not be described here, and the process proceeds to the next step 402 under the assumption that the result of the authentication is success.

In step 402, the printer 14 queries, i.e., transmits an inquiry to, the host apparatus 12 that has been authenticated (hereinafter, referred to as an authenticated host apparatus) about the storage state of the print queue, and checks the storage state. In other words, the printer 14 reads out a host IP that is registered with the association with the user ID that has been read. The printer 14 transmits an inquiry to a transmission destination corresponding to the host IP, and checks the print queue of the authenticated host apparatus that is given the host IP.

A process performed by the authenticated host apparatus which receives the inquiry is a process as described with reference to FIG. 7 according to the first exemplary embodiment. It is notable that, according to the second exemplary embodiment, information transmitted from the authenticated host apparatus in response to the inquiry from the printer 14 includes print-data identification information for identifying pieces of the print data stored in the print queue in addition to information indicating whether or not the print queue stores print data. The print-data identification information may be, for example, the file name of a file which the user has specified for printing, the date and time of creation or the date and time of transmission of the print data, or the number that was given to the print data in chronological order in which the print data was created.

In step 404, the printer 14 refers to the information received from the authenticated host apparatus and determines whether or not the print queue of the authenticated host apparatus stores print data.

If the result of the determination is YES in step 404, the process proceeds to step 406, and the printer 14 displays a list of the information about the print queue on the operation panel 34. According to the second exemplary embodiment, the pieces of the print-data identification information of the print data stored in the print queue are displayed on the operation panel 34.

Figure 10:
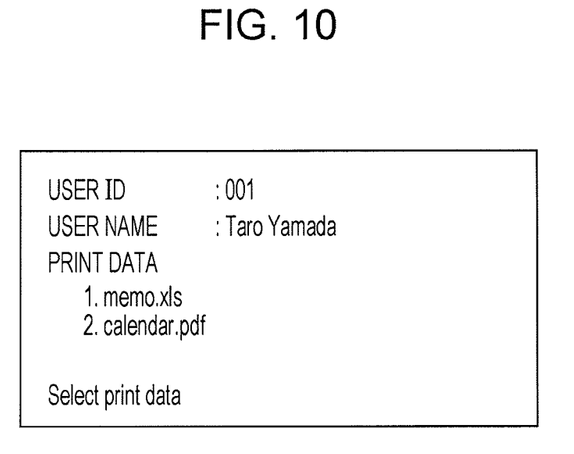
FIG. 10 is a diagram illustrating an exemplary display of print queue information.

FIG. 10 illustrates an exemplary display of information about a print queue. In the example illustrated in FIG. 10, a user ID, a user name, and print-data identification information obtained from an authenticated host apparatus are displayed. In addition, a message "Select print data." is also displayed to allow the user to select print data to be printed from the list. The user, for example, touches the touch panel of the operation panel 34 or operates operation keys so as to select the print-data identification information of the displayed print data. The number of selections may be more than one.

In step 408, the printer 14 determines whether or not the user has selected at least one of the pieces of the print data (the print-data identification information of the print data). If the printer 14 determines that the user has selected at least one of the pieces of the print data, the printer 14 transmits, to the authenticated host apparatus, a request for transmission of the selected piece of the print data in step 410.

A process performed by the authenticated host apparatus which receives the request for transmission is a process as described with reference to FIG. 8 according to the first exemplary embodiment. It is notable that, according to the second exemplary embodiment, the authenticated host apparatus reads out the piece of the print data selected by the user and transmits the print data that has been read to the printer 14, instead of all of the pieces of the print data stored in the print queue.

In step 412, the printer 14 receives the piece of the print data transmitted from the authenticated host apparatus in response to the request for transmission, and transmits a receipt notification to the authenticated host apparatus. The printer 14 also controls the print unit 35 to perform printing in accordance with the received piece of the print data.

According to the second exemplary embodiment, a user ID is used for authentication. Alternatively, the IC card stores a host IP, and the information of the host IP is read from the IC card, whereby authentication may be performed on the basis of whether or not the host IP is registered in the printer 14.

According to the second exemplary embodiment, an example in which an IC card is used for authentication has been described. Alternatively, without using IC cards, a user operates the operation panel 34 so as to input the user ID or the host IP, which may be used for authentication.

Furthermore, according to the first and second exemplary embodiments, the case has been described in which the printer 14 is not capable of receiving print data when the printer 14 is in the power-off state or in the power-saving state. The present invention is not limited to this case, and is applicable to a printer which is not capable of receiving print data when the printer is in the power-off state but which is capable of receiving print data when the printer is in the power-saving state.

Also, in the case where the printer 14 is not capable of receiving print data due to communication failure or failure of the communication I/F 36 of the printer 14, when a user turns on the printer 14 after failure recovery or failure correction, for example, the processes as described above may be performed.

Furthermore, according to the first exemplary embodiment, an example in which, when the print queue stores print data, the printer 14 obtains pieces of the print data from the host apparatuses 12 and performs printing has been described, but the way of obtaining print data is not limited to this. Even when authentication is not performed, similarly to the second exemplary embodiment, the printer 14 may first display the list of the print-data identification information of each of the registered host apparatuses 12 on the operation panel 34, and instruct a user to select at least one of the items in the list. The printer 14 may then transmit a request for transmission of the print data represented by the selected print-data identification information to the host apparatus 12, and obtain and print the print data represented by the selected print-data identification information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing apparatus comprising:
a print section that performs printing on the basis of print data;
a registering section that registers in advance an information processing apparatus, the information processing apparatus creating and transmitting print data in response to a print instruction from a user, and storing print data that has not been received by a transmission destination in a memory;
a determination section that determines whether or not the print data that has not been received by the printing apparatus is stored in the registered information processing apparatus, when the printing apparatus returns back to a state of being capable of receiving print data from a state of being not capable of receiving print data;
a request section that requests the information processing apparatus, in which the print data is determined to be stored, to transmit the stored print data;
a controller that controls the print section to perform printing on the basis of the print data transmitted in response to the request from the request section, when the print data is received; and
an acceptance section that accepts apparatus identification information for identifying the registered information processing apparatus or user identification information for identifying a user using the registered information processing apparatus,
wherein the determination section determines whether or not the print data that has not been received by the printing apparatus is stored in an information processing apparatus identified by the apparatus identification information accepted by the acceptance section or in an information processing apparatus used by a user identified by the user identification information accepted by the acceptance section, when the printing apparatus returns back to the state of being capable of receiving the print data from the state of being not capable of receiving the print data.

2. The printing apparatus according to claim 1, further comprising:
a display processing section that obtains print-data identification information for identifying the stored print data from the information processing apparatus in which the print data is determined to be stored, and displays the obtained print-data identification information on a display; and
a selection section that causes a user to select print-data identification information of print data to be printed from the print-data identification information displayed on the display,
wherein the request section requests the information processing apparatus, in which the print data is determined to be stored, to transmit, from the stored print data, print data identified by the print-data identification information selected by the selection section.

3. The printing apparatus according to claim 2,
wherein the state of being not capable of receiving the print data is a power-off state or a power-saving state.

4. The printing apparatus according to claim 1,
wherein the state of being not capable of receiving the print data is a power-off state or a power-saving state.

5. A printing system comprising:
the printing apparatus and the information processing apparatus according to claim 1, the information processing apparatus comprising a creation-and-transmission section that creates the print data in response to the print instruction from the user and transmits the print data to the printing apparatus.

6. An information processing apparatus comprising:
a creation-and-transmission section that creates print data in response to a print instruction from a user and that transmits the print data to a printing apparatus that includes
a print section that performs printing on the basis of the print data,
a registering section that registers in advance the information processing apparatus, the information processing apparatus creating and transmitting the print data in response to the print instruction from the user, and storing print data that has not been received by a transmission destination in a memory,
a determination section that determines whether or not the print data that has not been received by the printing apparatus is stored in the registered information processing apparatus, when the printing apparatus returns back to a state of being capable of receiving print data from a state of being not capable of receiving print data,
a request section that requests the information processing apparatus, in which the print data is determined to be stored, to transmit the stored print data, and
a controller that controls the print section to perform printing on the basis of the print data transmitted in response to the request from the request section, when the print data is received;
a storage processing section that stores the print data that has not been received in the memory when the print data transmitted from the creation-and-transmission section has not been received by the printing apparatus; and
a retransmission section that, when the printing apparatus makes a request for transmission of the print data stored in the memory, retransmits the print data corresponding to the transmission request to the printing apparatus,
wherein the printing apparatus further includes an acceptance section that accepts apparatus identification information for identifying the registered information processing apparatus or user identification information for identifying a user using the registered information processing apparatus, and
wherein the determination section determines whether or not the print data that has not been received by the printing apparatus is stored in an information processing apparatus identified by the apparatus identification information accepted by the acceptance section or in an information processing apparatus used by a user identified by the user identification information accepted by the acceptance section, when the printing apparatus returns back to the state of being capable of receiving the print data from the state of being not capable of receiving the print data.

7. A non-transitory computer readable medium storing a program causing a computer that is installed in a printing apparatus including a print section that performs printing on the basis of print data, to execute a process, the process comprising:
registering in advance an information processing apparatus, the information processing apparatus creating and transmitting print data in response to a print instruction from a user, and storing print data that has not been received by a transmission destination in a memory;
determining whether or not the print data that has not been received by the printing apparatus is stored in the registered information processing apparatus, when the printing apparatus returns back to a state of being capable of receiving print data from a state of being not capable of receiving print data;
requesting the information processing apparatus, in which the print data is determined to be stored, to transmit the stored print data; and
controlling the print section to perform printing on the basis of the print data transmitted in response to the request from the request section when the print data is received,
wherein the process further comprises accepting apparatus identification information for identifying the registered information processing apparatus or user identification information for identifying a user using the registered information processing apparatus, and
wherein the determining comprises determining whether or not the print data that has not been received by the printing apparatus is stored in an information processing apparatus identified by the apparatus identification information accepted by the acceptance section or in an information processing apparatus used by a user identified by the user identification information accepted by the acceptance section, when the printing apparatus returns back to the state of being capable of receiving the print data from the state of being not capable of receiving the print data.

8. A non-transitory computer readable medium storing a program causing a computer to execute a process comprising:
creating print data in response to a print instruction from a user and transmitting the print data to a printing apparatus that includes
a print section that performs printing on the basis of the print data,
a registering section that registers in advance the information processing apparatus, the information processing apparatus creating and transmitting the print data in response to the print instruction from the user, and storing print data that has not been received by a transmission destination in a memory,
a determination section that determines whether or not the print data that has not been received by the printing apparatus is stored in the registered information processing apparatus, when the printing apparatus returns back to a state of being capable of receiving print data from a state of being not capable of receiving print data,
a request section that requests the information processing apparatus, in which the print data is determined to be stored, to transmit the stored print data, and
a controller that controls the print section to perform printing on the basis of the print data transmitted in response to the request from the request section, when the print data is received;
storing the print data that has not been received in the memory when the print data that is created and transmitted has not been received by the printing apparatus; and
retransmitting, when the printing apparatus makes a request for transmission of the print data stored in the memory, the print data corresponding to the transmission request to the printing apparatus,
wherein the printing apparatus further includes an acceptance section that accepts apparatus identification information for identifying the registered information processing apparatus or user identification information for identifying a user using the registered information processing apparatus, and
wherein the determination section determines whether or not the print data that has not been received by the printing apparatus is stored in an information processing apparatus identified by the apparatus identification information accepted by the acceptance section or in an information processing apparatus used by a user identified by the user identification information accepted by the acceptance section, when the printing apparatus returns back to the state of being capable of receiving the print data from the state of being not capable of receiving the print data.

9. A processing apparatus comprising:
a registering section that registers in advance an information processing apparatus, the information processing apparatus creating and transmitting print data in response to a print instruction from a user, and storing print data that has not been received by a transmission destination in a memory;
a determination section that determines whether or not the print data that has not been received by a printing apparatus is stored in the registered information processing apparatus;
a request section that requests the information processing apparatus, in which the print data is determined to be stored, to transmit the stored print data; and
an acceptance section that accepts apparatus identification information for identifying the registered information processing apparatus or user identification information for identifying a user using the registered information processing apparatus,
wherein the determination section determines whether or not the print data that has not been received by the printing apparatus is stored in an information processing apparatus identified by the apparatus identification information accepted by the acceptance section or in an information processing apparatus used by a user identified by the user identification information accepted by the acceptance section.

10. The processing apparatus according to claim 9, wherein the determination section determines whether or not the print data that has not been received by the printing apparatus is stored in the information processing apparatus identified by the apparatus identification information accepted by the acceptance section or in the information processing apparatus used by the user identified by the user identification information accepted by the acceptance section, when the printing apparatus returns back to a state of being capable of receiving print data from a state of being not capable of receiving print data.

11. A processing apparatus comprising:
a registering section that registers in advance an information processing apparatus, the information processing apparatus creating and transmitting print data in response to a print instruction from a user, and storing print data that has not been received by a transmission destination in a memory;
a determination section that determines whether or not the print data that has not been received by a printing apparatus is stored in the registered information processing apparatus;
a request section that requests the information processing apparatus, in which the print data is determined to be stored, to transmit the stored print data; and
a display processing section that obtains print-data identification information for identifying the stored print data from the information processing apparatus in which the print data is determined to be stored, and displays the obtained print-data identification information on a display; and a selection section that causes a user to select print-data identification information of print data to be printed from the print-data identification information displayed on the display, wherein the request section requests the information processing apparatus, in which the print data is determined to be stored, to transmit, from the stored print data, print data identified by the print-data identification information selected by the selection section.

12. The processing apparatus according to claim 11, wherein the determination section determines whether or not the print data that has not been received by the printing apparatus is stored in the information processing apparatus identified by the apparatus identification information accepted by the acceptance section or in the information processing apparatus used by the user identified by the user identification information accepted by the acceptance section, when the printing apparatus returns back to a state of being capable of receiving print data from a state of being not capable of receiving print data.

* * * * *